US008102536B2

(12) United States Patent
Ward et al.

(10) Patent No.: US 8,102,536 B2
(45) Date of Patent: Jan. 24, 2012

(54) DETERMINING AND COMPENSATING FOR MODULATOR DYNAMICS IN INTERFEROMETRIC FIBER-OPTIC GYROSCOPES

(75) Inventors: Paul A. Ward, Dedham, MA (US); Michael Kishinevsky, North Andover, MA (US); Matthew Soucy, Hopkinton, MA (US); Stephen P. Smith, Acton, MA (US); Farhad Zarinetchi, Chelmsford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 12/963,977

(22) Filed: Dec. 9, 2010

(65) Prior Publication Data

US 2011/0102801 A1 May 5, 2011

Related U.S. Application Data

(62) Division of application No. 12/018,016, filed on Jan. 22, 2008, now Pat. No. 7,872,758.

(60) Provisional application No. 60/881,633, filed on Jan. 22, 2007.

(51) Int. Cl.
*G01B 9/02* (2006.01)
(52) U.S. Cl. ...................................... 356/460
(58) Field of Classification Search ........... 356/459–476
See application file for complete search history.

(56) References Cited

U.S. PATENT DOCUMENTS

| 4,948,252 A | 8/1990 | Cekorich |
| 5,090,809 A | 2/1992 | Ferrar |
| 5,170,225 A | 12/1992 | Ferrar |
| 5,184,195 A | 2/1993 | Goldner |
| 5,289,258 A | 2/1994 | Szafraniec et al. |
| 5,321,503 A | 6/1994 | Bramson |
| 5,363,195 A | 11/1994 | Ward et al. |
| 5,384,637 A | 1/1995 | Sanders et al. |
| 5,412,472 A | 5/1995 | Okada et al. |
| 5,420,684 A | 5/1995 | Carroll |
| 5,457,532 A | 10/1995 | August et al. |
| 5,459,575 A | 10/1995 | Malvern et al. |
| 5,469,257 A | 11/1995 | Blake et al. |
| 5,530,545 A | 6/1996 | Pavlath |
| 5,682,241 A | 10/1997 | Mark et al. |
| 5,719,674 A | 2/1998 | Martin et al. |
| 5,734,469 A | 3/1998 | Strandjord |

(Continued)

FOREIGN PATENT DOCUMENTS

EP 0586239 3/1994

(Continued)

OTHER PUBLICATIONS

Pavlath (1992) "Fiber optic gyro evolution concept to product," AIAA-1992-4415 IN: AIAA Guidance, Navigation and Control Conference, Hilton Head Island, SC, Aug. 10-12, 1992, Technical Papers. Pt. 2 (A92-55151 23-63). Washington, American Institute of Aeronautics and Astronautics, 575-586.

*Primary Examiner* — Hwa Lee
(74) *Attorney, Agent, or Firm* — Goodwin Procter LLP

(57) ABSTRACT

Determining linear modulator dynamics in an interferometric fiber-optic gyroscope may be accomplished by applying a stimulus at a point within the gyroscope, observing a response in an output of the gyroscope, and determining, from the observed response, the linear modulator dynamics.

6 Claims, 4 Drawing Sheets

U.S. PATENT DOCUMENTS

| | | | |
|---|---|---|---|
| 5,781,300 | A | 7/1998 | Standjord et al. |
| 5,914,781 | A | 6/1999 | Jaklitsch et al. |
| 5,923,424 | A | 7/1999 | Sanders et al. |
| 5,926,275 | A | 7/1999 | Sanders et al. |
| 5,946,097 | A | 8/1999 | Sanders et al. |
| 5,953,123 | A | 9/1999 | Jaklitsch et al. |
| 5,999,304 | A | 12/1999 | Sanders et al. |
| 6,028,668 | A | 2/2000 | Rider |
| 6,046,810 | A | 4/2000 | Sanders et al. |
| 6,351,310 | B1 | 2/2002 | Emge et al. |
| 6,469,792 | B1 | 10/2002 | Arnn |
| 6,473,182 | B1 | 10/2002 | Tazartes et al. |
| 6,556,509 | B1 * | 4/2003 | Cekorich et al. .............. 356/477 |
| 6,563,589 | B1 | 5/2003 | Bennett et al. |
| 6,765,678 | B2 | 7/2004 | Strandjord et al. |
| 7,034,946 | B2 | 4/2006 | Chen et al. |
| 7,038,783 | B2 | 5/2006 | Standjord et al. |
| 7,333,209 | B2 | 2/2008 | Greening et al. |
| 7,336,364 | B2 | 2/2008 | Greening et al. |
| 7,817,284 | B2 | 10/2010 | Ward |
| 2001/0030752 | A1 | 10/2001 | Scruggs et al. |
| 2003/0128365 | A1 | 7/2003 | Strandjord et al. |
| 2007/0103691 | A1 | 5/2007 | Greening et al. |
| 2007/0121116 | A1 | 5/2007 | Greening et al. |
| 2008/0079946 | A1 | 4/2008 | Greening |
| 2009/0201510 | A1 | 8/2009 | Ward et al. |

FOREIGN PATENT DOCUMENTS

| | | |
|---|---|---|
| EP | 0990118 | 4/2000 |
| EP | 1790944 | 5/2007 |

* cited by examiner

DETERMINING AND COMPENSATING FOR MODULATOR DYNAMICS IN INTERFEROMETRIC FIBER-OPTIC GYROSCOPES

CROSS-REFERENCE TO RELATED APPLICATIONS

This application is a divisional of, and claims priority to and the benefit of, U.S. patent application Ser. No. 12/018,016, filed on Jan. 22, 2008, which claims priority to and the benefit of U.S. Provisional Patent Application No. 60/881,633, filed on Jan. 22, 2007. The entire disclosures of these two applications are hereby incorporated herein by reference in their entireties.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00030-05-C-0007 awarded by the U.S. Navy.

TECHNICAL FIELD

The invention generally relates to interferometric fiber-optic gyroscopes. More particularly, the invention relates, in various embodiments, to determining and compensating modulator dynamics in the interferometric fiber-optic gyroscopes.

BACKGROUND

Interferometric fiber-optic gyroscopes are increasingly used in medium to high performance inertial applications. For example, interferometric fiber-optic gyroscopes are used in inertial navigation applications, such as in military applications of a tactical nature (i.e., of short range, short time, and lower performance) and of a strategic nature (i.e., of long range, long time, and higher performance). Interferometric fiber-optic gyroscopes are also used in many commercial applications. As one example, a tactical-grade interferometric fiber-optic gyroscope is used to stabilize the yellow line projected on the ground during a televised football game to indicate the point that must be crossed by the offense to make a "first down."

Interferometric fiber-optic gyroscopes typically use integrated-optic phase modulators to introduce a non-reciprocal phase shift to counter-propagating light beams to aid in the measurement of inertial rate. These phase modulators often exhibit linear low-frequency dynamics (i.e., a complex gain that varies as a function of frequency). Conventional implementations of interferometric fiber-optic gyroscopes typically do not, however, compensate for these linear modulator dynamics. As a result, the presence of the linear modulator dynamics often degrades the performance of the gyroscopes and causes errors.

SUMMARY OF THE INVENTION

The present invention, in various embodiments, determines, compensates, reduces, and/or removes error terms associated with linear modulator dynamics that are introduced by a phase modulator into an interferometric fiber-optic gyroscope that uses a closed loop scheme. Linear modulator dynamics are those dynamics introduced by the phase modulator that do not typically contain nonlinear elements and that may be characterized fully by determining the frequencies of a number of poles and zeroes.

In one embodiment, the present invention enables in-situ (i.e., with the phase modulator embedded in the interferometric fiber-optic gyroscope system) determination of the linear modulator dynamics. More specifically, the linear modulator dynamics may be determined through observation of the gyroscope's response to a signal, such as a phase modulator step signal. The linear modulator dynamics may then be compensated for by determining a transfer function of the phase modulator and programming, for example, a filter, such as a digital pre-emphasis filter, to multiply a drive signal of the phase modulator with the inverse of its transfer function. In one embodiment, this compensation substantially reduces the deleterious effects of the linear modulator dynamics on the performance of the interferometric fiber-optic gyroscope.

As described below, several advantages may be achieved using the approach of the present invention, including the measurement of the linear modulator dynamics in-situ and the compensation of the linear modulator dynamics on a substantially continuous, periodic, or other basis. In one embodiment, phase modulator calibration is performed substantially continuously while the interferometric fiber-optic gyroscope measures an inertial input, which thereby improves the performance of the gyroscope.

In general, in one aspect, the invention features a method for determining, in-situ, linear modulator dynamics in an interferometric fiber-optic gyroscope. A first signal is applied to a phase modulator located within the interferometric fiber-optic gyroscope, a response in an output of the interferometric fiber-optic gyroscope to the first signal is observed, and linear modulator dynamics introduced by the phase modulator are determined from the observed response. The first signal applied to the phase modulator may be a step.

In general, in another aspect, the invention features a method for determining, in-situ, linear modulator dynamics in an interferometric fiber-optic gyroscope. A stimulus is applied at a point within the interferometric fiber-optic gyroscope, a response in an output of the interferometric fiber-optic gyroscope to the stimulus is observed, and linear modulator dynamics present in the interferometric fiber-optic gyroscope are determined from the observed response.

In various embodiments, the linear modulator dynamics are determined by determining at least one pole and/or zero of the phase modulator and by determining the high frequency gain of the phase modulator. The linear modulator dynamics may also be compensated for by pre-filtering a drive signal before it drives the phase modulator. For example, the drive signal may be multiplied by an inverse of a transfer function for the phase modulator. The compensation of the linear modulator dynamics may occur, for example, while the interferometric fiber-optic gyroscope is also performing functions unrelated to the compensation.

In general, in yet another aspect, the invention features an interferometric fiber-optic gyroscope. The gyroscope includes a phase modulator and a means for pre-filtering a drive signal before it drives the phase modulator, thereby compensating for linear modulator dynamics present in the interferometric fiber-optic gyroscope.

In various embodiments, the interferometric fiber-optic gyroscope also includes a means for determining a transfer function of the phase modulator. The means for pre-filtering the drive signal may be a digital pre-emphasis filter and may operate to multiply the drive signal by an inverse of the transfer function.

In general, in still another aspect, the invention features a method for compensating a frequency-dependent complex gain of a phase modulator. A first signal is applied to a phase modulator located within an interferometric fiber-optic gyroscope, a transfer function of the phase modulator is determined based, at least in part, on a response in an output of the interferometric fiber-optic gyroscope to the first signal, and a drive signal of the phase modulator is multiplied with an inverse of the transfer function.

In general, in a further aspect, the invention features an interferometric fiber-optic gyroscope. The gyroscope includes a phase modulator and a means for multiplying a drive signal for the phase modulator with an inverse of a transfer function of the phase modulator before the drive signal drives the phase modulator, thereby compensating for linear modulator dynamics present in the interferometric fiber-optic gyroscope. In various embodiments, the interferometric fiber-optic gyroscope may further include a means for determining the transfer function of the phase modulator.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 2A illustrates a plurality of signals present at various points in the interferometric fiber-optic gyroscope of FIG. 1 when linear modulator dynamics introduced therein are not compensated for;

FIG. 2B illustrates a plurality of signals present at various points in the interferometric fiber-optic gyroscope of FIG. 1 when linear modulator dynamics introduced therein are compensated for.

DESCRIPTION

In various embodiments, the present invention pertains to methods for determining and compensating, in-situ, linear modulator dynamics present in an interferometric fiber-optic gyroscope. In broad overview, in accordance with one embodiment of the invention, a stimulus is applied at a point within an interferometric fiber-optic gyroscope, such as to a phase modulator of the gyroscope. A response to the stimulus is then observed in an output of the interferometric fiber-optic gyroscope, and the linear modulator dynamics determined from the observed response. The modulator dynamics may then be compensated for by, for example, multiplying a drive signal for the phase modulator with an inverse of a transfer function for the phase modulator.

Figure 1:
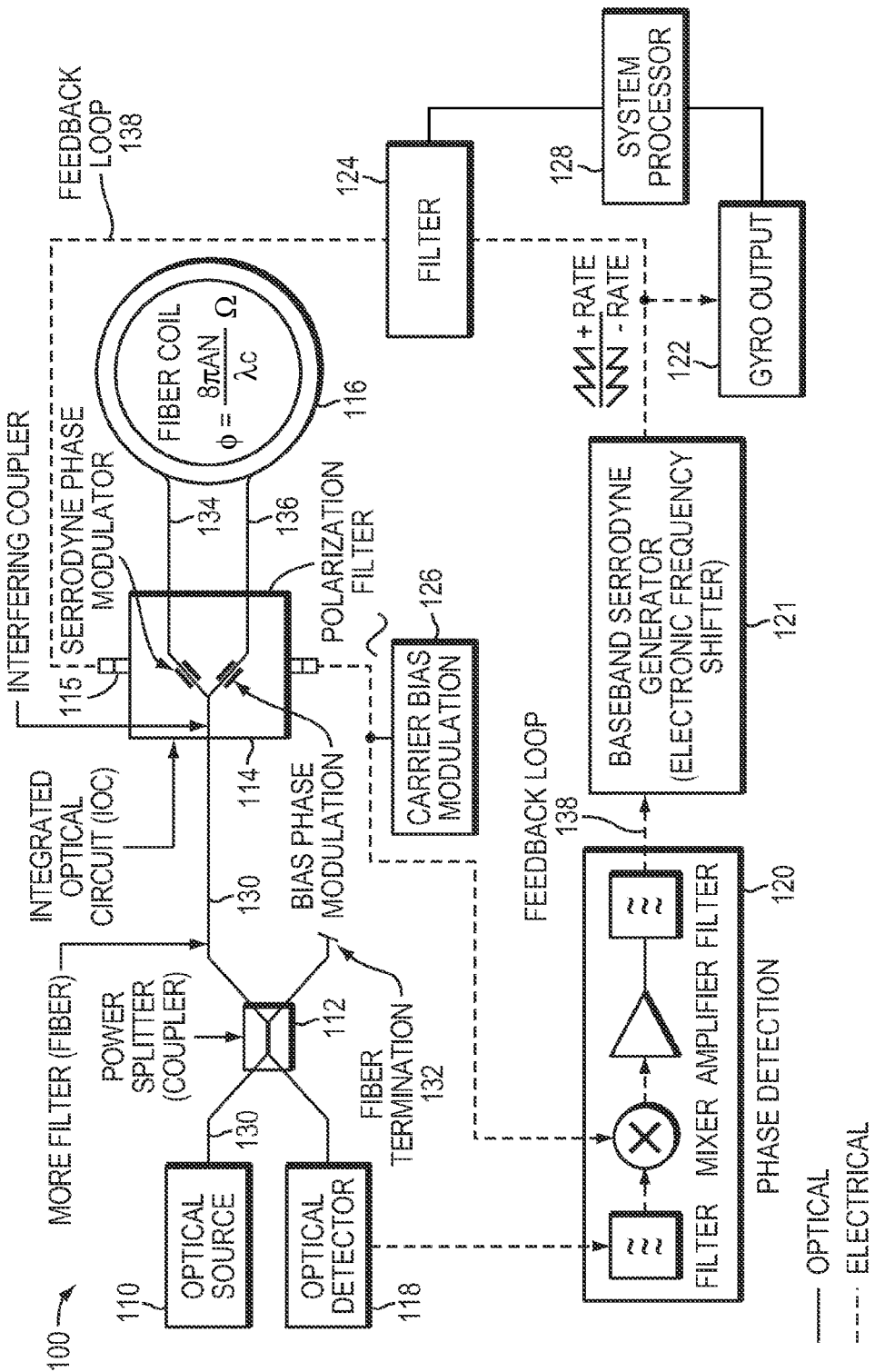
FIG. 1 illustrates an interferometric fiber-optic gyroscope in accordance with one embodiment of the invention.

FIG. 1 depicts one embodiment of an interferometric fiber-optic gyroscope 100, the performance of which may be improved using the approach of the present invention. Among other elements, the exemplary interferometric fiber-optic gyroscope 100 includes an optical source 110, a power splitter/coupler 112, a phase modulator (or integrated optical circuit) 114, a fiber coil 116, an optical detector 118, phase detection electronics 120, a baseband serrodyne generator 121, output 122, a filter 124, which may be, for example, a digital pre-emphasis filter, carrier bias modulation electronics 126, and a system processor 128.

In general overview of the operation of the interferometric fiber-optic gyroscope 100 and of the propagation of light therethrough, the optical source 110 emanates, in one embodiment, a wavepacket that travels down a single-mode fiber 130 acting as a mode filter. The power splitter/coupler 112 then divides the wavepacket. In one embodiment, approximately 50% of the wavepacket is sent along the single-mode fiber 130 to the phase modulator 114, with a second, remaining portion of the wavepacket being dissipated in, for example, a terminated, coreless optical fiber 132. In one embodiment, the terminated, coreless optical fiber prevents the second portion of the wavepacket from reflecting back into the rest of the interferometric fiber-optic gyroscope 100.

In one embodiment, the phase modulator 114 is a Y-branch phase modulator that is constructed from, for example, lithium niobate ($LiNbO_3$) waveguides. The Y-branch phase modulator 114 includes a drive input 115 for receiving, as further described below, a drive signal. In addition, the Y-branch phase modulator 114 may polarize the portion of the wavepacket it receives from the power splitter/coupler 112, and also further split that portion of the wavepacket into two approximately equal sub-portions. One of the two sub-portions may then travel down a first arm 134 of the phase modulator 114 and the other of the two sub-portions down a different, separate arm 136 of the phase modulator 114. As depicted in FIG. 1, the first arm 134 of phase modulator 114 causes the first sub-portion of the wavepacket to travel around the fiber coil 116 in a clockwise direction, while the second arm 136 of the phase modulator 114 causes the second sub-portion of the wavepacket to travel around the fiber-coil in a counter-clockwise direction.

In one embodiment, when the fiber coil 116 is stationary, each sub-portion of the wavepacket travels the same distance in circulating the fiber coil 116 and thus acquires the same amount of phase. In other words, the two sub-portions of the wavepacket travel "reciprocal" paths and the net phase difference between them is zero. When the fiber coil 116 is rotated, however, the two sub-portions of the wavepacket may acquire a "nonreciprocal" net phase difference due to the Sagnac effect. More specifically, the sub-portion of the wavepacket traveling in the same direction as the rotation of the fiber coil 116 will take slightly longer to circulate the fiber coil 116 than the sub-portion of the wavepacket traveling in a direction opposite the direction of rotation of the fiber coil 116, thereby leading to a nonreciprocal net phase difference between the two sub-portions of the wavepacket. This nonreciprocal net phase difference may be increased by using multiple turns of fiber in the fiber coil 116. In particular, the nonreciprocal net phase difference due to the Sagnac effect is given mathematically as:

$$\Delta \varphi = \frac{8\pi AN}{\lambda_0 c_0} \Omega$$

where $\Delta\phi$ is the phase shift between the two sub-portions of the wavepacket, A is the area enclosed by the fiber coil 116, N is the number of turns in the fiber coil 116, $\Omega$ is the speed of rotation of the fiber coil 116, $c_0$ is the speed of light in a vacuum, and $\lambda_0$ is wavelength of light in a vacuum.

In one embodiment, as the clockwise and counter-clockwise sub-portions of the wavepackets complete their transits through the fiber coil 116, the Y-branch phase modulator 114 recombines them and sends them back along the single-mode fiber 130 towards the power splitter/coupler 112. As before, the power splitter/coupler 112 sends approximately 50% of the recombined wavepacket to optical detector 118, which converts the wavepacket's light into a photovoltage, while a remaining portion of the recombined wavepacket is dissipated in, for example, the optical source 110.

In one embodiment, during operation of the interferometric fiber-optic gyroscope 100, carrier bias modulation electronics 126 apply a square-wave voltage waveform to the second arm 136 of the phase modulator 114. This bias waveform may have a maximum value of $V_{\pi/4}$ volts and a minimum value of $-V_{\pi/4}$ volts, where $V_\pi$ is the voltage required to change the phase of light traveling through an arm of the of the fiber coil 116 by $\pi$ radians. In one embodiment, the period of the bias waveform is $2\tau$, where $\tau$ is the time it takes for a wavepacket to circulate the fiber coil 116. In one such embodiment, the carrier bias modulation unit 126 first applies a voltage of $V_{\pi/4}$ to the second arm 136 of the phase modulator 114, changing the phase of, for example, the outgoing counter-clockwise wavepacket by $\pi/4$ radians, and then, at a time $\tau$ later, applies a voltage of $-V_{\pi/4}$ to the second arm 136 of the phase modulator 114, changing the phase of the incoming clockwise wavepacket by $-\pi/4$ radians. Accordingly, when the clockwise and counter-clockwise wavepackets interfere, their phase shifts will combine to produce a net phase shift of $\pi/2$ radians. Similarly, when the carrier bias modulation unit 126 applies a voltage of $-V_{\pi/4}$ to the second arm 136, the phase modulator 114 shifts the phase of an outgoing counter-clockwise wavepacket by $-\pi/4$ radians, and when the carrier bias modulation unit 126 applies a voltage of $V_{\pi/4}$ to the second arm 136, the phase modulator 114 shifts the phase of an incoming clockwise wavepacket by $\pi/4$ radians, producing a net phase shift therebetween of $-\pi/2$ radians. The optical phase between the clockwise and counter-clockwise wavepackets may thus dither between $-\pi/2$ and $\pi/2$ radians.

In one embodiment, when the fiber coil 116 is at rest, the optical phase shift between the clockwise and counter-clockwise wavepackets will continuously alternate between $-\pi/2$ and $\pi/2$ radians, and each of the clockwise and counter-clockwise wavepackets will have identical light intensity values. In such a case, the optical detector 118 outputs a constant-level, non-zero voltage in response to the constant light intensity inputs. As the fiber coil 16 rotates, however, the Sagnac phase shift of $\Delta\phi$, described above, will cause the optical phase shift between the clockwise and counter-clockwise wavepackets to alternate between $\Delta\phi-\pi/2$ radians and $\Delta\phi+\pi/2$ radians. In such a case, the optical detector 118 outputs a square wave (alternating between two different voltage levels) having the same frequency as the carrier bias modulation signal (i.e., $\frac{1}{2}\tau$).

In one embodiment, the output of the optical detector 118 is sent to phase detection block 120, where it is first filtered to remove noise, and then mixed with the carrier bias modulation waveform to obtain the amplitude of the signal. This mixed signal may then amplified and filtered to control the frequency components of the signal, prior to being input into a feedback loop 138.

In one embodiment, the baseband serrodyne generator 121, after receiving a signal from the phase detection block 120, outputs a serrodyne (i.e., ramp) waveform through feedback loop 138 to drive the phase modulator 114. This "closed loop" scheme of interferometric fiber-optic gyroscope operation keeps the optical phase between the clockwise and counter-clockwise wavepackets output from the fiber coil 116 dithering between $-\pi/2$ and $\pi/2$ radians (rather than between $\Delta\phi-\pi/2$ radians and $\Delta\phi+\pi/2$ radians), which maximizes sensitivity and certainty and ensures scale factor linearity. The serrodyne signal is intended to offset the Sagnac phase $\Delta\phi$ generated by the rotation of fiber coil 116. The magnitude of the Sagnac phase may then be derived from the slope of the serrodyne signal, which is output at the gyroscope output 122.

Finally, as described further below, the filter 124 and the system processor 128 of the interferometric fiber-optic gyroscope 100 may be used together to determine and compensate for the linear modulator dynamics introduced by the phase modulator 114 into the gyroscope 100 when the gyroscope 100 is operated in the closed loop scheme. More specifically, the filter 124 may be any filter, such as a digital pre-emphasis filter, capable of receiving the serrodyne signal from the baseband serrodyne generator 121 and outputting a modified signal to drive the phase modulator 114. In one embodiment, this modified output signal compensates for the linear modulator dynamics introduced by the phase modulator 114. For its part, the system processor 128 may, as described below, determine from the gyroscope output 122 the linear modulator dynamics introduced by the phase modulator 114, and then program the filter 124 to compensate for the linear modulator dynamics. For example, the system processor 128 may calculate a transfer function of the phase modulator 114, and program the filter 124 to multiply the serrodyne signal output from the baseband serrodyne generator 121 with an inverse of that transfer function. The system processor 128 may include and/or be implemented as any software program and/or hardware device, for example as an application specific integrated circuit (ASIC) or as a field programmable gate array (FPGA), that is capable of achieving the functionality described herein. Alternatively, the processor 128 may be one or more general-purpose microprocessors (e.g., any of the PENTIUM microprocessors supplied by Intel Corp.) programmed using any suitable programming language or languages (e.g., C++, C#, java, Visual Basic, LISP, BASIC, PERL, etc.).

Figure 2A:
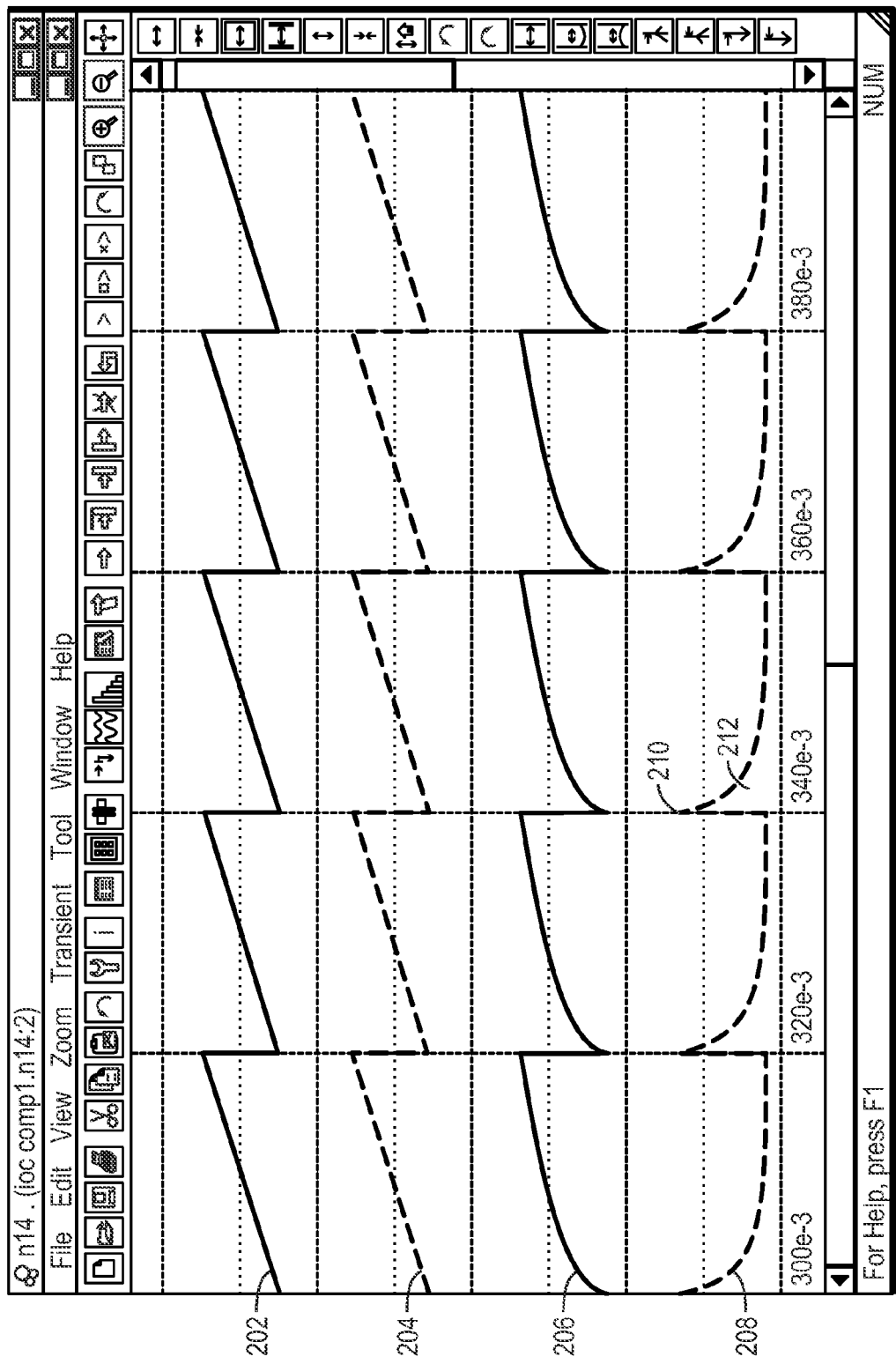

FIG. 2A illustrates a plurality of signals 202, 204, 206, 208 that exist in the interferometric fiber-optic gyroscope 100 when the linear modulator dynamics introduced by the phase modulator 114 are not compensated for (i.e., when the filter 124 is either not present or not used in the interferometric fiber-optic gyroscope 100). More specifically, in such a case, the serrodyne signal 204 output by the baseband serrodyne generator 121 is used directly as a drive signal for the phase modulator 114. The linear modulator dynamics inherent in the phase modulator 114, however, may distort an output of the phase modulator 114 such that the actual phase modulator response signal 206 differs from the desired phase modulator response signal 202. These distortions in the actual phase modulator response signal 206 may cause the transient signal 208 to appear in the gyroscope output 122.

Figure 2B:
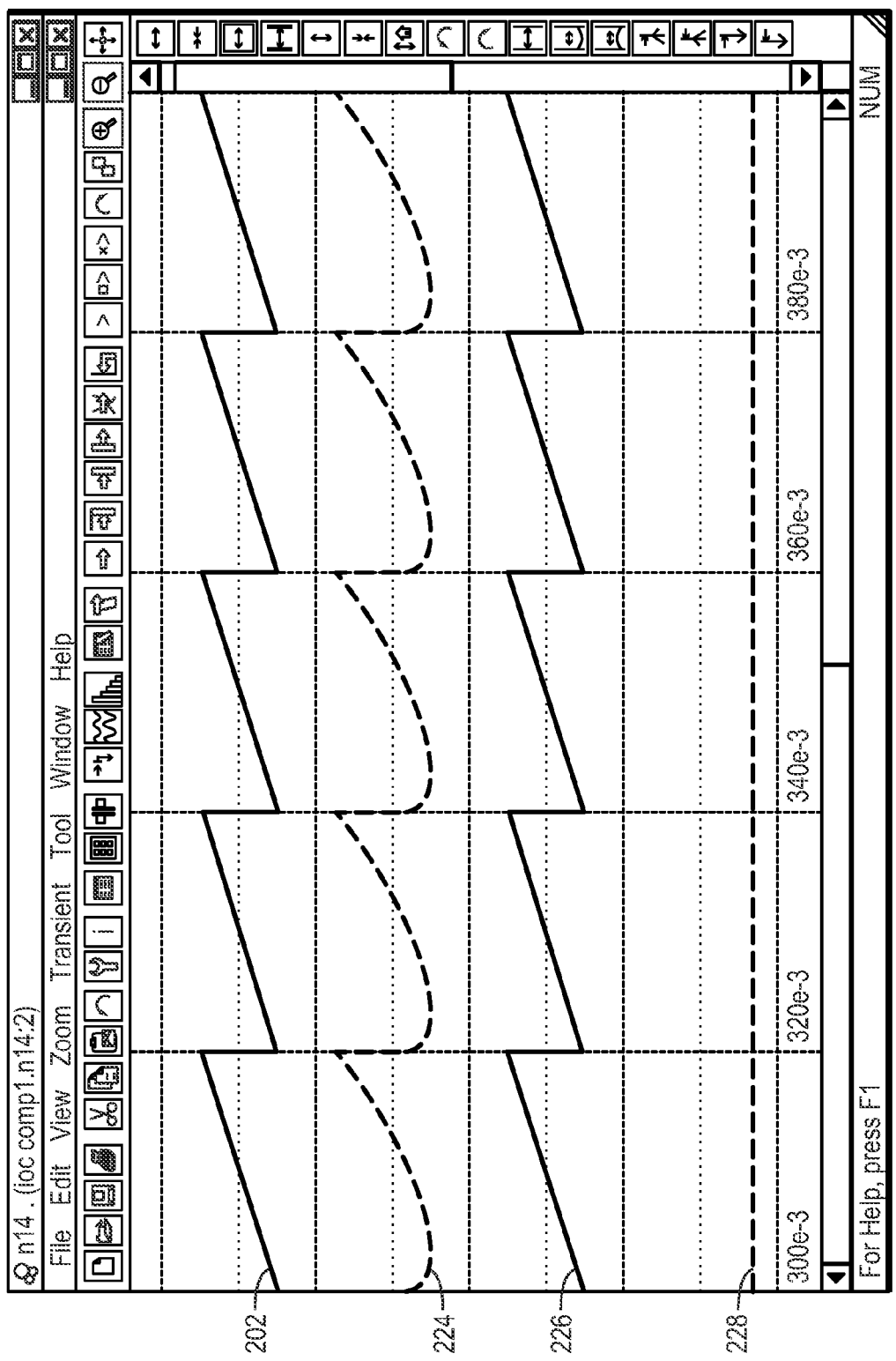

FIG. 2B illustrates, on the other hand, a plurality of signals 202, 224, 226, 228 that exist in the interferometric fiber-optic gyroscope 100 when the linear modulator dynamics introduced by the phase modulator 114 are compensated for (i.e., when the filter 124 is present and used in the interferometric fiber-optic gyroscope 100 as described below). More specifically, in such a case, the serrodyne signal 204 (see FIG. 2A) output by the baseband serrodyne generator 121 is modified by the filter 124 such than a modified signal 224 drives the phase modulator 114. As illustrated in FIG. 2B, by driving the phase modulator 114 with the modified signal 224, the transient signal 228 in the gyroscope output 122 is flat (i.e., is non-existent, as the linear modulator dynamics introduced by the phase modulator 114 have been compensated), and the actual phase modulator 114 response signal 226 substantially matches the desired phase modulator 114 response signal 202.

Figure 3:
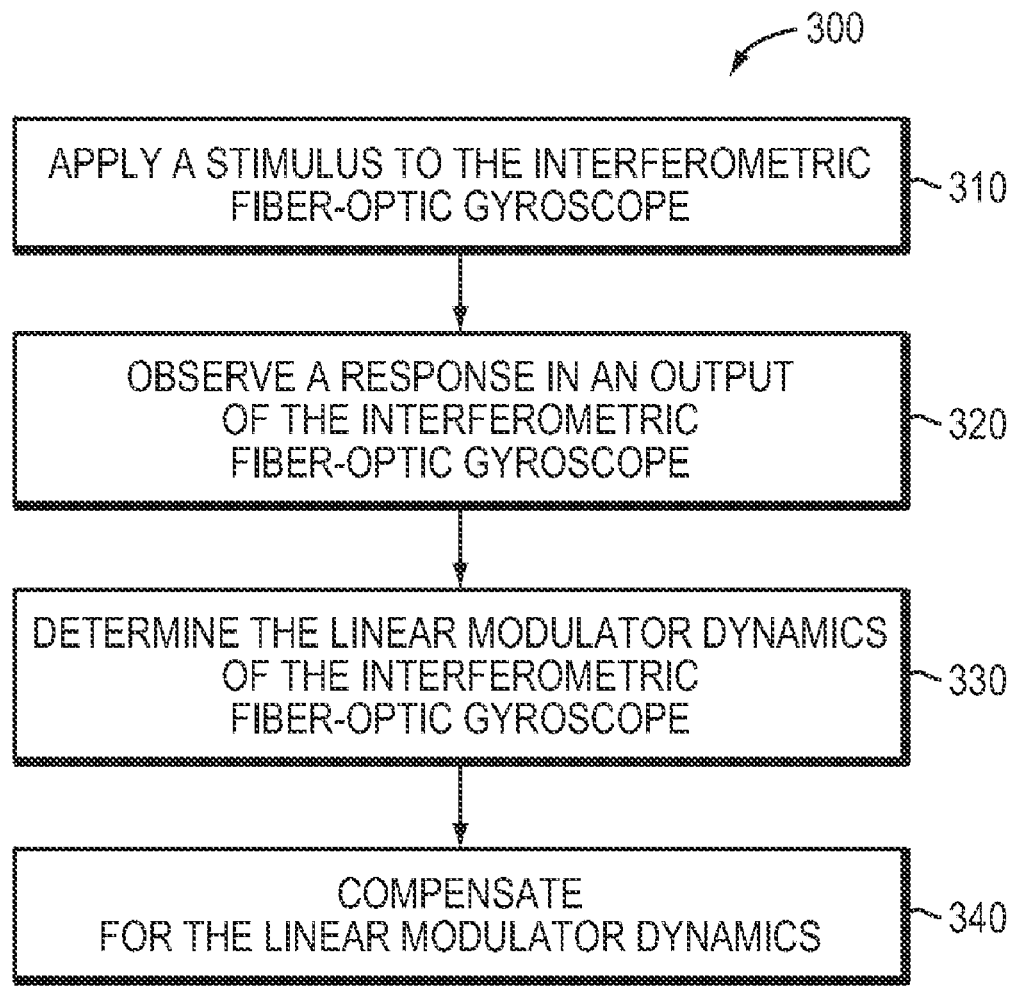
FIG. 3 is a flow diagram of an illustrative approach to determining and compensating for linear modulator dynamics in an interferometric fiber-optic gyroscope in accordance with the invention.

Referring now to FIG. 3, one embodiment of a method 300 for determining and compensating for linear modulator dynamics in an interferometric fiber-optic gyroscope, for example using the components of the gyroscope 100 depicted in FIG. 1, is shown. In brief overview, a stimulus is applied to the interferometric fiber-optic gyroscope 100 at step 310, a response of the gyroscope 100 to the stimulus is observed at step 320, and linear modulator dynamics present in the gyroscope 100, which may be introduced by phase modulator 114, are determined at step 330. Optionally, the linear modulator dynamics may be compensated for in step 340.

In greater detail, and with reference to FIGS. 1 and 3, at step 310 a stimulus or signal is applied at a point within the interferometric fiber-optic gyroscope 100. For example, in one embodiment, the stimulus is applied to the drive input 115 of the phase modulator 114. The stimulus may be a step function applied at time t=0 and may have an amplitude of $\theta_{STEP}$. Alternatively, the stimulus may be applied at other points within the gyroscope 100. In addition, signals or stimuli other than a step function, such as, for example, an impulse signal, may be employed. In general, any known waveform, preferably one that contains energy density across a frequency range of interest, may be used. As long as the waveform is known and a model exists for the phase modulator 114, the phase modulator 114 may be characterized and compensated as described below.

In one embodiment, the stimulus is applied to the interferometric fiber-optic gyroscope 100 prior to it being used in normal operation (i.e., prior to it being used to measure rotation). In such an embodiment, a separate device may be used to apply the stimulus. Alternatively, in another embodiment, the stimulus is applied during the normal operation of the interferometric fiber-optic gyroscope 100 and the gyroscope 100 is periodically calibrated and re-calibrated during its use. For example, the stimulus may be part of the signal driving the phase modulator 114.

At step 320, the response of the interferometric fiber-optic gyroscope 100 to the stimulus is observed. In one embodiment, the response, for example the transient response 208 depicted in FIG. 2A, is observed at gyroscope output 122 by the system processor 128. Again, the response to the stimulus may be observed by the system processor 128 prior to the gyroscope 100 being used in normal operation or while it is used in normal operation.

At step 330, the linear modulator dynamics introduced by the phase modulator 114 are determined by the system processor 128. In one embodiment, the system processor 128 determines the linear modulator dynamics from the response observed at step 320. Using, as an example, a step function having an amplitude of $\theta_{STEP}$ that is applied to the drive input 115 of the phase modulator 114 at time t=0 in step 310, it has been observed that that step function produces a small transient signal (see, for example, the transient signal 208 depicted in FIG. 2A) in the gyroscope output 122 when linear modulator dynamics are present. In one embodiment, these linear modulator dynamics are derived by the system processor 128 from the characteristics of the transient signal 208.

In greater detail, if the linear modulator dynamics are first-order (i.e., the phase modulator 114 frequency-domain representation includes one pole and one zero), the time-domain step response, r(t), to this applied step function is an exponential having the form:

$$r(t) = \text{Peak} \exp(-t/\tau_P)$$

where Peak is the maximum value 210 (see FIG. 2A) of the time-domain step response, t is the time, and $\tau_P$ is as defined below.

This response (expressed as interferometer phase) may be represented by:

$$\theta_{ye}(t) = \theta_{STEP}\left[\frac{\tau_P}{\tau_Z} - 1\right]\left[1 - \exp\left(\frac{\tau}{\tau_P}\right)\right]\exp\left(\frac{-t}{\tau_P}\right)u(t)$$

where $\theta_{ye}(t)$ is the relevant component of the response to the step, referred to as the Y-junction phase, u(t) denotes the unit step function, and t is the time. The above equation is for a step having an amplitude of $\theta_{STEP}$ applied to the phase modulator 114 at time t=0, and a phase modulator 114 characterized by a single pole located at $\omega_P=1/\tau_P$ and a single zero located at $\omega_Z=1/\tau_Z$. The term $\tau$ denotes the transit time for light to traverse the fiber coil 116.

In this described embodiment, the peak value 210 of the time domain response (including its polarity) and the area 212 (see FIG. 2A) under the time domain response allows for direct determination of the pole and zero of the phase modulator 114. For a first-order phase modulator 114, this pole and zero completely characterize the response of the phase modulator 114. For phase modulators 114 having higher-order dynamics, this pole and zero characterize the first-order dynamics of the phase modulator 114.

More specifically, it has been found that:

$$\tau_P = \frac{\text{Area}}{\text{Peak}}$$

and that $$\tau_Z = \tau_P \frac{\frac{\theta_{STEP}}{\text{Peak}}\left[1 - \exp\left(\frac{\tau}{\tau_P}\right)\right]}{1 + \frac{\theta_{STEP}}{\text{Peak}}\left[1 - \exp\left(\frac{\tau}{\tau_P}\right)\right]}$$

In one embodiment, determining the linear modulator dynamics at step 330 further includes determining the high frequency gain of the phase modulator 114 (i.e., the voltage, $V_{\pi, high\,freq}$, required to be applied by the carrier bias modulation electronics 126 at high frequencies in order to change the phase of light traveling through an arm of the of the fiber coil 116 by $\pi$ radians). In one embodiment, this value $V_{\pi, high\,freq}$ is known, may be used by the carrier bias modulation electronics 126 as described above, and is stored in the system processor 128. In another embodiment, the carrier bias modulation electronics 126 or a separate device may be used to test the phase modulator 114 to determine the high frequency gain, $V_{\pi, high\,freq}$, and that determined value stored in the system processor 128.

Once the pole, zero, and high frequency gain of a first-order phase modulator 114 are identified, the transfer function for the phase modulator 114 is completely characterized. Accordingly, at step 340, the linear modulator dynamics introduced into the interferometric fiber-optic gyroscope 100 by the phase modulator 114 may be compensated through the use of the filter 124. In one embodiment, for example, the filter 124 is a digital pre-emphasis filter that pre-filters the serrodyne drive signal output by the baseband serrodyne generator 121 before it drives the phase modulator 114. In such an embodiment, the system processor 128 may, for example, program the filter 124 to multiply the serrodyne drive signal by an inverse of the transfer function for the phase modulator 114. As was previously described with reference to FIG. 2B, doing so eliminates the transient in the output 122 of the interferometric fiber-optic gyroscope 100. As will be understood by one skilled in the art, the compensation of the linear modulator dynamics at step 340 may occur while the gyroscope is also performing functions unrelated to the compensation, such as measuring the inertial rate of rotation.

Other approaches through which the linear modulator dynamics may be derived from the response of the gyroscope 100 to a step or other stimulus applied to the phase modulator 114, or to a step or other stimulus applied at another point in the gyroscope 100, exist. All such approaches are considered to be within the scope of the invention. It should also be noted that several step responses, or responses to other stimuli, may be required to achieve the desired accuracy in the measurement of the linear modulator dynamics. For example, for a phase modulator 114 having second or higher-order dynamics, the first-order dynamics and a first pole/zero pair of the phase modulator 114 may first be determined and compensated as described above with reference to the method 300 of FIG. 3. The steps of the method 300 may then be repeated to determine the second-order dynamics and a second pole/zero pair of the phase modulator 114, repeated again to determine the third-order dynamics and a third pole/zero pair of the phase modulator 114, and so on until the linear modulator dynamics are either fully or sufficiently characterized and compensated for.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An interferometric fiber-optic gyroscope, comprising:
   a phase modulator; and
   a digital pre-emphasis filter for pre-filtering a drive signal before it drives the phase modulator, thereby compensating for linear modulator dynamics present in the interferometric fiber-optic gyroscope.

2. The interferometric fiber-optic gyroscope of claim 1 further comprising a means for determining a transfer function of the phase modulator.

3. The interferometric fiber-optic gyroscope of claim 2, wherein the digital pre-emphasis filter multiplies the drive signal by an inverse of the transfer function.

4. A method for compensating a frequency-dependent complex gain of a phase modulator, comprising:
   applying a first signal to a phase modulator located within an interferometric fiber-optic gyroscope;
   determining a transfer function of the phase modulator based, at least in part, on a response in an output of the interferometric fiber-optic gyroscope to the first signal; and
   multiplying a drive signal of the phase modulator with an inverse of the transfer function.

5. An interferometric fiber-optic gyroscope, comprising:
   a phase modulator; and
   a means for multiplying a drive signal for the phase modulator with an inverse of a transfer function of the phase modulator before the drive signal drives the phase modulator, thereby compensating for linear modulator dynamics present in the interferometric fiber-optic gyroscope.

6. The interferometric fiber-optic gyroscope of claim 5 further comprising a means for determining the transfer function of the phase modulator.

* * * * *